United States Patent [19]

Koenig et al.

[11] Patent Number: 4,507,197

[45] Date of Patent: Mar. 26, 1985

[54] APPARATUS AND METHOD FOR PRODUCING SHOT-FREE MINERAL WOOL

[75] Inventors: Alan R. Koenig; Edward L. Moon, both of St. Petersburg, Fla.

[73] Assignee: Jim Walter Corporation, Tampa, Fla.

[21] Appl. No.: 406,424

[22] Filed: Aug. 9, 1982

[51] Int. Cl.³ .............................................. B07B 9/02
[52] U.S. Cl. ............................................. 209/2; 209/3; 209/12; 209/21; 209/30; 209/37; 65/10
[58] Field of Search .............. 209/3, 28, 29, 2, 30, 209/31, 36, 37, 21, 12; 65/10, 2

[56] References Cited

U.S. PATENT DOCUMENTS

| | | | |
|---|---|---|---|
| 1,873,394 | 8/1932 | Hallam | 209/37 |
| 2,375,284 | 5/1945 | Coss | 154/28 |
| 2,711,247 | 6/1955 | Hills | 209/29 |
| 2,825,933 | 3/1958 | McMullen | 19/72 |
| 3,308,945 | 3/1967 | Oja | 209/3 |
| 3,384,238 | 5/1968 | Alpha | 209/139 |
| 3,615,009 | 10/1971 | Norton | 209/139 |
| 3,883,334 | 5/1975 | Cassidy et al. | 65/2 |
| 4,026,478 | 5/1977 | Albert et al. | 241/24 |
| 4,134,731 | 1/1979 | Houser | 209/12 |
| 4,244,720 | 1/1981 | Boen et al. | 65/10 |
| 4,268,294 | 5/1981 | Laughlin et al. | 209/3 |

*Primary Examiner*—Frank W. Lutter
*Assistant Examiner*—William Bond
*Attorney, Agent, or Firm*—James W. Grace; Charles W. Vanecek

[57] ABSTRACT

An apparatus and dry method for de-shotting shot-containing mineral wool fibers wherein the fibers are treated in a granulator to compact them into entangled nodules, and the nodules are passed through an air classifier to open up and de-shot them. In a preferred embodiment, a felted layer of mineral wool is subjected to a first granulation step to divide the layer into a multiplicity of lightly compacted nodules which are then partially de-shotted, and the partially de-shotted nodules are subjected to a second granulation step to more tightly compact the nodules before they are introduced into the air classifier.

14 Claims, 3 Drawing Figures

APPARATUS AND METHOD FOR PRODUCING SHOT-FREE MINERAL WOOL

BACKGROUND OF THE INVENTION

1. Field of the Invention

The present invention relates generally to an apparatus and method for producing mineral wool, and, more particularly, to an apparatus and dry process for producing mineral wool comparatively free from shot, beads, or slugs. The term "mineral wool" is employed in its generic sense and is meant to include wool or fibers formed from rock, slag, fused glass, glass mixtures thereof and other heat liquefiable raw materials capable of being converted into fibers.

2. Description of the Prior Art

In the manufacture of inorganic fibrous material, such as slag wool, glass wool or mineral wool, a molten stream of the desired inorganic material is fiberized by various means, such as by impinging the molten stream on rapidly rotating discs or by impinging a high velocity blast of air or steam against the stream of inorganic material. Customarily the fibers, upon formation, are suspended in a gaseous medium. The fibrous suspension is usually directed into a collecting chamber of some sort wherein the suspended fibrous material is removed from suspension to form a fibrous mass.

The production of inorganic fibers, such as by the aforementioned methods, is customarily accompanied by the formation of a substantial amount of unfiberized material, such as pellets, partially fiberized pellets and fiber bundles or slugs. In many instances, up to 50% and more of unfiberized material is formed during the manufacture of inorganic fibers. This unfiberized material is very detrimental in certain mineral fiber applications, such as where the mineral fibers are used as heat insulation material in paper-enclosed batts, as reinforcing agents in spray-on heat insulation, as fibers in rigid acoustical panels and tiles, or as reinforcing fibers for plastics, friction materials, papers and felts. Accordingly, it is highly desirable to provide an inorganic fibrous material having decreased amounts of unfiberized material.

Heretofore, numerous attempts have been made to provide apparatuses and methods for the satisfactory separation of the fibers and unfiberized material produced in the manufacture of inorganic fibrous material. Both wet and dry separation techniques have been employed. One such "dry" technique which has been utilized in processing mineral fiber involves granulation and the subsequent employment of a series of devices for removing coarse unfiberized material. In this conventional process, much of the finer shot remains trapped in the nodules. This procedure is not satisfactory to produce "clean," i.e., "shot-free," mineral fiber.

It would be highly desirable if an improved apparatus and dry method for de-shotting mineral fiber could be found which avoid the disadvantages of the prior art, and result in the manufacture of relatively "shot-free" mineral fibers at a particularly high rate of production.

OBJECTS OF THE INVENTION

It is therefore an object of the present invention to provide an improved apparatus and dry method for treating mineral fiber to remove unfiberized material therefrom.

It is another object of the present invention to provide a dry method for treating nodulated or granulated mineral fibers, particularly nodules of mineral wool and like fibrous materials, to separate unfiberized material therefrom, wherein the method comprises the steps of granulating mineral fibers and feeding the granulated fibers through an air classifier at a particularly high production rate.

It is yet another object of the present invention to provide an apparatus and dry method for de-shotting entangled masses of fibers, such as mineral wool fibers, wherein a felted layer of the fibers is subjected to a nodulating means to compact the fibers into tightly interlocked nodules, and said nodules are passed through an air classifier to remove the bulk of shot or other unfiberized particles from the fibers while, at the same time, keeping breakage of the fibers to a minimum.

These and other objects and advantages of the present invention will become apparent to those skilled in the art when the instant disclosure is read in conjunction with the accompanying drawings.

SUMMARY OF THE INVENTION

The above objects have been achieved in the apparatus and dry method of the present invention for separating unfiberized material or "shot" from mineral fiber, wherein a mass of fibrous material to be de-shotted is first subjected to a granulation step and then the granulated fibers or nodules are passed through an air separator or classifier for removal of shot therefrom. The initial granulation step has the effect of subdividing the mass of mineral fibers into a plurality of small fiber bunches or granules, and the fibers, while in this "granulated" or "nodulated" condition, are introduced into the air separator. Surprisingly, it has been discovered that this granulation pretreatment, which greatly enhances the production capacity of the air separator, at the same time permits almost complete shot removal from the mineral fiber. The pre-prilling of mineral fiber prior to its introduction into an air classifier is contrary to the natural tendency and invariable practice up to now to feed open fiber tufts for shot removal.

While the invention may be carried out by granulating mineral fiber immediately after its formation and then feeding this granulated stock directly to an air classifier, the granulated stock advantageously can be subjected to various conventional processing steps before being introduced into the classifier, such as treatment by a shot cleaning rotary screen followed by fiber concentration in a cyclone-type device, fiber baling, etc. Whether or not it is subjected to such post-granulation processes, the mineral fiber treated in the classifying step of the present invention generally contains a fairly high shot content, such as, e.g., from about 20 to 50 weight percent, and is in a compacted condition. When this compacted shot-containing fibrous mass is fed through the air classifier, the fiber bunches are opened up so that substantial shot removal is readily effected.

In a highly advantageous embodiment of the present invention, a shot-containing mineral fiber mat is subjected to a first granulation step to shred the mat and make it more easily handleable and to form lightly compacted nodules which are then partially de-shotted, and the partially de-shotted nodules are subjected to a second granulation step to more tightly compact the nodules before they are introduced into the air classifier. That the mineral fiber is only loosely compacted by the first granulation aids in the partial shot removal because conventional shot removal devices, such as rotary screens, can separate shot more easily from the loosely compacted nodules than from tightly compacted ones. The second granulation step balls the mineral fibers into a highly unfluffed condition, whereby it becomes possible to feed the fibers into and through the air classifier at a very high production rate. This compaction also has the unfortunate effect of entrapping the shot within the entangled fiberized material, but this phenomenon surprisingly does not interfere to any significant extent with the separation of the entrapped shot from the fiberized material.

The air classifier of the present invention is of the type in which the classifying chamber is provided with means for opening up the fibrous nodules formed in the granulating step of the invention so that the coarse unfiberized material entrapped in the nodules is readily separated from the opened up nodules. Accordingly, the classifying chamber preferably includes a rotor or so-called centrifugal particle rejector for throwing out by centrifugal force the coarse shot particles while allowing the fine fibrous particles of the nodules to pass out of the chamber for collection. The rotor is suitably adapted both to subject the air-entrained fibrous nodules inside the classifying chamber to a centrifugal force, and to permit the separated finer fibers to pass therethrough and out of the chamber. The classifying rotor advantageously comprises a rotating vane means such as the one disclosed in U.S. Pat. No. 3,615,009.

A highly advantageous feature of the present process is that it provides a particularly efficient way to separate shot from relatively long mineral fibers. In the method of U.S. Pat. No. 4,026,478, mineral wool fibers are subjected to the action of an air classifier for shot separation, but this prior art method requires that the fibers be substantially shortened by milling or grinding before they are fed to the air classifier. The present invention avoids any such substantial shortening of fiber lengths, and instead takes the novel approach of simply compacting the mineral fibers before introducing them to the air classifier, thereby both increasing the fiber production rate and contributing to a beneficial preservation of fiber lengths.

DESCRIPTION OF THE DRAWINGS

The invention will now be described with reference to the accompanying drawings in which.

DETAILED DESCRIPTION OF THE INVENTION

At the present time mineral fiber is prepared by passing a stream of molten material such as slag or molten rock or glass into a rapidly moving stream of hot air or steam, or by hurling a molten stream of liquid melt from a spinning rotor or rotors. The molten material is thus blown out or formed into mineral wool fibers, which are then collected. In this process, a large quantity of unfiberized particles, conventionally termed "shot", is formed in the resulting product because of the imperfect drawing out of the molten material into fibers. The non-fibrous, particulate material can make up as much as 20–50% and more of the weight of the mineral wool. The present invention provides a novel means for treating this conventionally produced mineral wool to bring about substantial removal of the non-fibrous shot, beads, and slugs normally found therein.

Figure 1:
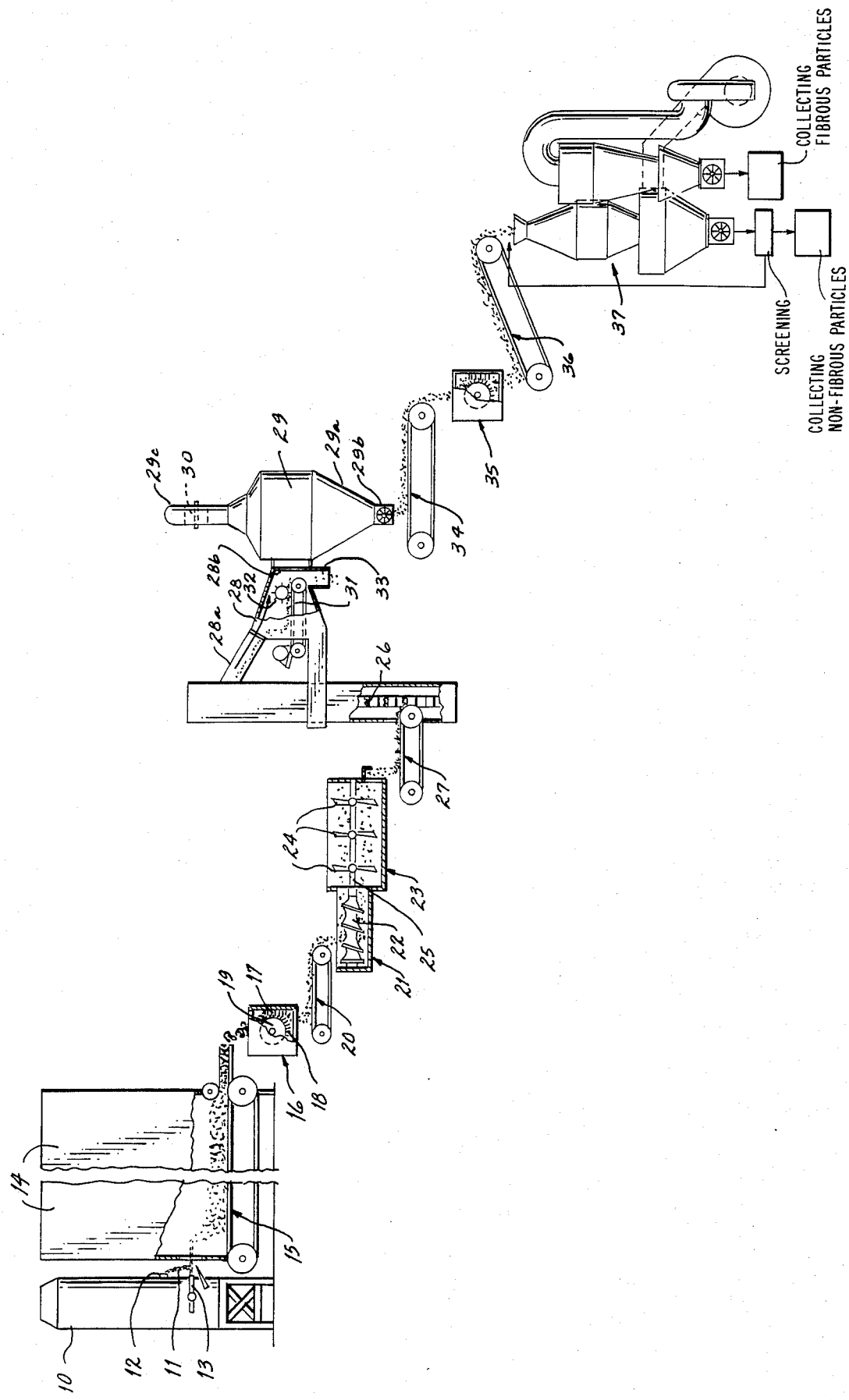
FIG. 1 is a diagrammatic, side elevational view, partly broken away, of an apparatus for carrying out the method of the present invention.

Referring now to the drawings, and particularly to FIG. 1, there is diagrammatically shown an apparatus suitable for carrying out the method of the present invention. A melting furnace 10, which may be a cupola, as illustrated, or a tank furnace, or the like, melts the raw mineral fiber forming material, such as foundry process slags, silica, alumino-silicates, other siliceous material, rock, or mixtures thereof. A molten stream 11 of the fiberizable inorganic material issues from an orifice 12 and falls in front of a fiberizing means 13, which as shown is a nozzle releasing a high velocity jet of gas such as air or steam. The molten stream is converted into a fiberized product, which leaves the fiberizing area in the form of a fast moving gaseous suspension comprising discrete fibers and unfiberized material and is carried by the force of the gaseous jet into a blow room 14 located adjacent the melting furnace.

The fiberized product settles in intermingled relationship on the floor of the blow room, which may suitably comprise a moving conveyor 15, to form a felted layer thereon. The conveyor carries the felted layer from the blow room and delivers the layer to a granulating or nodulating device 16, diagrammatically illustrated as having stationary teeth 17 and rotatable teeth 18. In granulator or nodulator 16, the layer of mineral fiber is forced through rows of suitably mounted stationary teeth 17 by means of multiple rows of teeth 18 mounted on the periphery of cylinder 19, which is rotated by any suitable means (not shown) to divide the layer into small nodules or aggregates. Any conventional granulating device, such as the type manufactured by Indiana Industries, Muncie, Indiana, may be used to nodulate the mineral fibers.

The nodules may be discharged onto a conveyor 20, which carries them to a hopper 21 from whence they are conveyed by screw conveyor or the like 22 into a shot cleaning drum or tumbling device 23 comprising a wire cage, either suitably mounted for rotation (a rotary screen) or having rotating paddles or the like 24 mounted therein. The paddles 24 and conveyor 22 are carried by a shaft 25 that may be driven from any convenient source of power. A shaker screen system such as the one disclosed in U.S. Pat. No. 2,808,929 may be used in place of the aforementioned shot cleaning devices.

Positioned to receive the nodules discharged from drum 23 and to convey them to bucket-type elevators 26 is a conveyor 27. Elevators 26 discharge the granules onto an inclined portion 28a of conduit 28. The remaining portion 28b of conduit 28 communicates with the interior of a cyclone-type centrifugal separator 29, which is commonly referred to as a "cyclone." Cyclone 29 has a lower, cone shaped body 29a communicating with a lower discharge tube 29b. Extending from the upper end of the cyclone 29 is a tubular discharge duct 29c. Air is drawn through the cyclone by the fan 30. As air with entrained granules is drawn by fan 30 along an angular path (shown by an arrow) through conduit 28 and into cyclone 29, heavy, unfiberized shot and slugs tend to fall downwardly onto the belt 31. Doffer roll 32 is positioned adjacent the upper surface of belt 31 to pick up deposited wool from the belt and aid in the separation of fiberized from unfiberized material. The shot and slugs are carried by belt 31 over discharge tube 33 and fall out of the system.

The granules move downwardly through cyclone 29 and out its lower discharge passage 29b. The unloading of cyclone 29 is accomplished through an unloading valve which prevents entry of air back up into the cyclone through passage 29b. The graulated material moves through the passage 29b and drops onto conveyor 34, which carries the material to another granulator 35 to further nodulate the fibers. Granulator 35 discharges onto conveyor 36 and the finished nodules are then transported to any suitable air classifying means, as diagrammatically illustrated by air classifier or sifter 37. In another embodiment of the invention, the second granulation step is omitted and the nodules are delivered from cyclone 29 to the air sifter.

The air classifying means brings about separation of shot from the granulated mineral fiber. The shot separation can be accomplished in any air-circulation type classifier whose classifying chamber includes means for opening up the fibrous nodules formed in the granulating step(s) to separate the nodules into fibers and shot. More specifically, the invention utilizes an air separator or classifier in which a rotary device (e.g., a rotary rejector fan) is stationed within the separating chamber so as to sweep or cast out the relatively coarse or oversized shot particles from an air stream circulated through the chamber. In one preferred embodiment, the rotary device, which is commonly called a rotary rejector, comprises a cylindrical array of vertically disposed blades, located centrally within the classifying chamber for rotation on a vertical axis.

An especially suitable air classifier is described in U.S. Pat. No. 3,615,009, issued Oct. 26, 1971, the teachings of which are incorporated herein by reference. This classifier, which has been found particularly useful in separating fibrous and nonfibrous materials, is commercially available from The Georgia Marble Company of Atlanta, Ga. Its classifying system is designed so that an air stream is recirculated through the system and finer particles are separated from coarser particles by being drawn through a particle separator which passes therethrough finer particles while rejecting coarser particles. The apparatus includes a centrifugal separator into which the finer particles are drawn with the stream of air and removed from the system.

Figure 2:
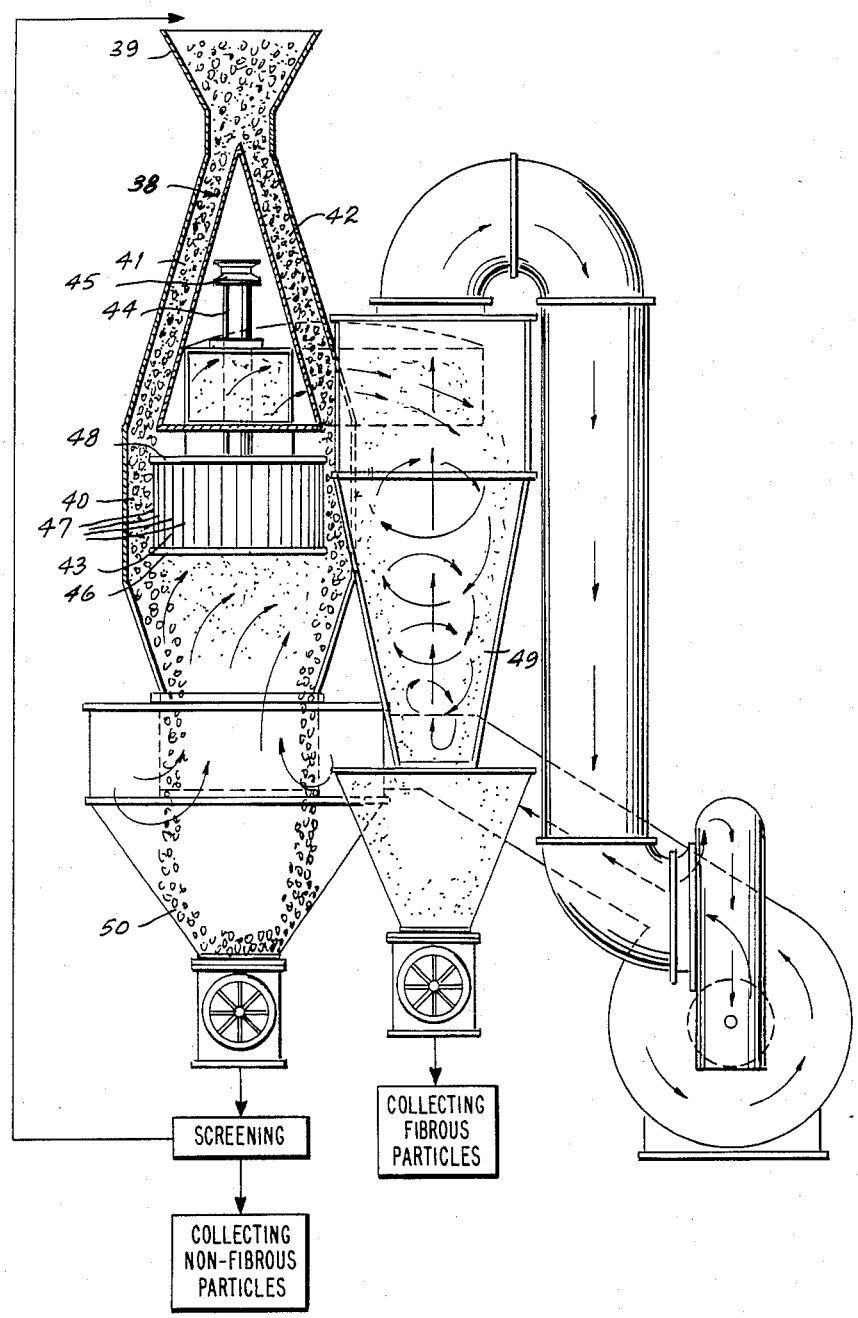
FIG. 2 is a diagrammatic, side elevational view illustrating an air classifying system used for separating shot from granulated mineral wool in accordance with the present invention.

In the preferred classifying system of the present invention shown in FIG. 2, the granulated mineral fiber 38 to be classified is introduced into the system through a feed inlet 39. The fibrous nodules subsequently are drawn into a classifying chamber 40 through a pair of conduits 41 and 42. The classifying chamber contains a rotary particle rejector 43 of the type described in U.S. Pat. Nos. 3,384,238 and 3,615,009. The rotary rejector is supported within the classifying chamber by a vertically disposed shaft 44. A pulley 45 for driving the shaft is mounted on the upper end of the shaft 44. The rejector 43 includes a lower disk member 46, which is securely attached to the lower end of the shaft for rotation therewith. Extending upwardly from the edge of the disk 46 are a plurality of closely spaced thin rejector blades 47, which are held in place at the top and bottom by annular member 48 and disk 46, respectively.

The granulated mineral fiber emerging from the lower ends of conduits 41 and 42 passes into the outer periphery of the classifying chamber. The interior of the rotary rejector 43 is in communication with a source of suction and the passage from the classifying chamber through the rotary rejector to the source of suction is defined by the array of vertically disposed blades 47 which permit passage therethrough of finer fibrous particles but reject coarser shot particles. The rotary rejector is driven at a selected speed to produce a swirling air current within the classifying chamber. The air in the chamber is sent into rotary motion so that the fibrous nodules entering through the conduits 41 and 42 are uniformly distributed into the rising and rotating column of air (indicated by the arrows in FIG. 2). Due to the centrifugal action of the rejector 43, only the finer fibrous particles can pass between the blades 47 of the rotary rejector into the interior thereof, while the larger shot particles are thrown out by the centrifugal force generated by the rejector.

The air entraining the finer fibrous particles passes from the interior of the rotary rejector to a centrifugal or cyclone type separator 49 from which these finer, substantially shot-free particles are removed from the classifying system. The coarser shot particles rejected by the blades spin downwardly through the classifying chamber and are discharged through the outlet cone 50.

The air classifier can be easily adjusted or modified, if necessary, to allow feeding and treatment of various granulated fibrous products. By way of example only, the Georgia Marble air classifier may be driven at a rotor speed of about 250 to 1500, preferably 400 to 700, r.p.m. in treating the granulated mineral fiber. By putting highly granulated rather than opened up mineral wool through the air classifier, a 50 to 100% increase in the unit's production capacity can be realized. At the same time, the classifier has an outstanding capacity for separating shot from granulated mineral wool. For example, the shot content of a granulated feedstock containing 30–50% shot can be reduced to less than 2%.

The production yield of the air classifying process can be improved by subjecting the process waste to a second pass through the air classifier. In this way, up to 90% or more of the fiber can be collected. Prior to any reclassifying, it is desirable to subject the process waste to a screening operation or the like to remove excess shot therefrom. For example, the reclassification can be accomplished by passing the waste material over a vibratory set of screens, such as a longitudinal or rotary Sweco screen system. The de-shotted mineral fiber as well as salable shot recovered are then prepared for the marketplace.

While the Georgia Marble air sifter has proved highly effective in the present invention, any air classifier or separator which is capable of opening up granulated mineral fiber and separating the fine fiber particles from the coarse shot particles can be used. Suitable air classifiers or separators include those available from Donaldson Company, Inc., Majac Division, Minneapolis, Minn., Sturtevant Mill Company, Boston, Mass., Alpine American Corp., Natick, Mass., Prater/Bauermeister, Inc., Chicago, Ill., Pulverizing Machinery, Division of Mikropul Corporation, Summit, N.J., Vortec Products Company, Compton, Calif., and P-S Process Machinery, Inc., Berwick, La.

Figure 3:
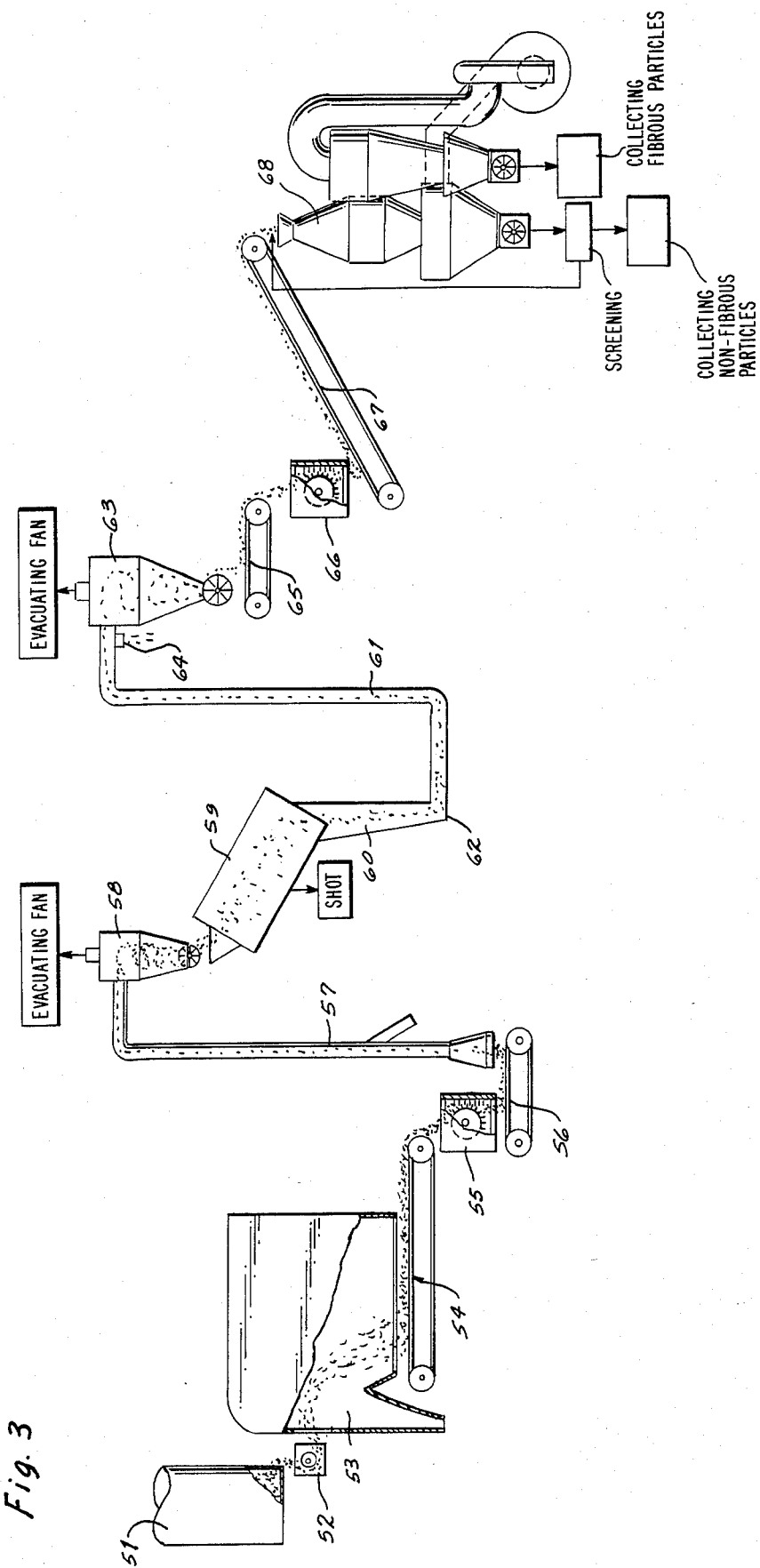
FIG. 3 is a diagrammatic, side elevational view of another apparatus for carrying out the present invention.

FIG. 3 shows a particularly advantageous embodiment of an apparatus for carrying out the method of the present invention. The raw material melted in cupola 51 is fiberized by spinning device 52 and delivered to collection chamber 53. Extending across the bottom of the chamber 53 is a conveyor 54 of the open mesh screen type. A suction means (not shown) operates beneath the upper reach of conveyor 54 to help in collecting the fibrous material in the form of a felted layer on the conveyor, which carries the felt to granulator 55.

The mineral wool felt is fed by conveyor 54 into granulator 55 which breaks the felt into clumps or nodules. Advantageously, granulator 55 is operated at relatively low speed, such as about 200–400 r.p.m., in order to loosely nodulate the wool. The nodules fall from the granulator onto conveyor 56 which carries them to a position below the open receiving end of duct work or airlift 57. Air injected into duct work 57 causes the light fibrous nodules to travel up the duct work and pass into cyclone 58, while some of the loose, heavy shot and slugs tend to remain on the conveyor, from which this unfiberized material falls out of the system. The operation of cyclone 58 is conventional and it functions to concentrate the fibrous nodules and drop them into a chute leading to shot cleaning rotary screen 59.

The nodules discharged from rotary screen 59 fall into a discharge tube 60 whose lower end communicates with duct work 61. Outlet tube 60 has a perforated bottom 62 to help separate shot from the fibrous nodules, which are carried through duct work 61 and into a conventional cyclone 63 by means of an evacuating fan (not shown) which draws air through the system. An outlet port 64 is provided in the section of duct 61 adjacent to cyclone 63 to permit heavy, unfiberized materials to fall out of the system.

The fibrous nodules drop out of cyclone 63 onto conveyor 65, which delivers them to another granulator 66 to further nodulate the fibers. Granulator 66 advantageously is run at a faster speed, such as about 1000–2000 r.p.m., than the previously employed granulator 55. This second granulation step additionally compacts the fibrous nodules, forming them into very closely packed, ball-like lumps, which are delivered by conveyor 67 to air classifier 68. By way of example, the pellet size of the granulated mineral wool feed stock supplied to the air classifier is as follows:

| Screen Size | Percent Passing |
| --- | --- |
| ⅞ inch screen | 99 |
| ⅜ inch screen | 95 |
| U.S. Standard #4 screen | 30 |

Because they are tightly compacted, the nodules are easily introduced into and processed by the air classifier to yield a substantially shot-free mineral wool product at a high production rate and concomitant low cost.

The invention is further illustrated by the following example:

EXAMPLE

Mineral wool was granulated in accordance with the procedure described above with reference to FIG. 1 of the drawings. The mineral wool was granulated twice, first in granulator 16 and then, after the treatment in shot cleaning drum 23 and cyclone 29, in granulator 35. This granulated wool was packaged in 25 lb bags and transported to the Air Sifter Division of The Georgia Marble Company, Atlanta, Ga. for treatment in the Georgia Marble G-40 Air Sifter.

A feed hopper was attached to the feed inlet of the air sifter to facilitate feeding of the fibrous mineral wool product into the unit. The air sifter was readied further for the mineral wool classification by removing alternate blades from the 100 blade rotor unit to produce a 50 blade rotor; opening up of the rotor top ring to the maximum extent possible (inside diameter 17") to facilitate removal of separated product; and enlarging the crossover duct connecting the rotor suction tube with the product cyclone separator.

The granulated wool was de-shotted in the air sifter in three production runs, the rotor speed for each run being set at 550 rpm. Prior to de-shotting, the feed wool had a shot content of 25.6%. The results were as follows:

A. Production Run No. 1

This run used 8 bags of the granulated wool. The bags were ripped open and the small tufts or balls of mineral wool were poured into the feed hopper at as uniform a rate as possible by hand. One slight clog was encountered, but it was easily cleared. The total run time was 438 seconds, of which 69 seconds was consumed in opening bags, etc. A total of 113 lb of cleaned wool was collected, while 95 lb of tailings was collected. The process yield was thus 54.3%. Subtracting out the time consumed in bag handling indicated that the average feed rate was 2029 lb/hr. Based on these values, the production rate of saleable product was 1102 lb/hr. The shot content of the cleaned wool sample analyzed was 1.52%.

Production Run No. 2

This run was a repeat of Run No. 1 except that an effort was made to feed the wool into the process hopper at a somewhat fster rate. The total run time for the 8 bags was 375 seconds, of which 65 seconds was consumed in bag handling and clearing a slight clog. A total of 102 lb of cleaned fiber was collected while the tailings weighed 101 lb. The process yield was thus 50.2%. The production rate, subtracting out handling time, was 2357 lb/hr. Saleable product production rate calculates to 1183 lb/hr and the shot content of the cleaned wool was 1.32%.

C. Production Run No. 3

The remainder of the granulated wool (30 bags) was consumed during this run, wherein an attempt was made to feed the wool pellets at as fast a rate as possible. One slight clog was encountered. The total time consumed during the run was 1131 seconds. Of this total, 326 seconds was consumed in bag handling operations, leaving a total running time of 805 seconds. A total of 351 lb of cleaned fiber was collected. Tailings amounted to 381 lb. The indicated feed rate, subtracting bag handling time, was 3274 lb/hr and the process yield was 47.8%. The indicated saleable product production rate was 1565 lb/hr and the shot content of the cleaned fiber was 2.6%.

The average length of the cleaned fiber produced during the above production runs was determined to be:

Average length $(\mu m) = 713 \pm 191$

Average length $(in.) = 0.028 \pm 0.008$.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A dry method of de-shotting shot-containing mineral wool fibers such as that obtained from a blow room floor comprising the steps of:
   (a) subjecting said mineral wool fibers to a nodulating means to compact said fibers into entangled nodules comprising fibrous and non-fibrous particles,
   (b) passing said nodules through an air classifying means to open up said nodules and separate fibrous particles of said nodules from a by-product mainly consisting of non-fibrous particles, wherein said air classifying means comprises an air classifier whose classifying chamber includes a rotor adapted both
   (i) to subject air-entrained fibrous nodules inside said classifying chamber to a centrifugal force, and
   (ii) to permit opened up and de-shotted fibrous particles to pass therethrough and out of said classifying chamber, and
   (c) collecting the opened up and de-shotted fibrous particles and by-product.

2. The method of claim 1 wherein, before said air classifying step (b), said nodules produced in said nodulating step (a) are subjected to further treatment including the steps of:
   (a) partially de-shotting said nodules, and
   (b) additionally nodulating said partially de-shotted nodules to further compact said nodules.

3. The method of claim 1 for de-shotting shot-containing mineral wool fibers wherein step (a) comprises:
   (a) nodulating said mineral wool fibers to compact said fibers into lightly entangled nodules comprising fibrous and non-fibrous particles,
   (b) partially de-shotting said nodules by subjecting said nodules to the action of a screen device to separate non-fibrous from fibrous particles of said nodules, and then passing said partially de-shotted nodules in an air stream along an enclosed path to separate by gravity heavier non-fibrous particles from lighter fibrous particles of said nodules,
   (c) directing said air stream containing the partially de-shotted nodules through a cyclone to concentrate said nodules, and
   (d) additionally nodulating said concentrated and partially de-shotted nodules to further compact said nodules.

4. The method of claim 1 for de-shotting shot-containing mineral wool fibers wherein step (a) comprises:
   (a) nodulating said mineral wool fibers to compact said fibers into lightly entangled nodules comprising fibrous and non-fibrous particles,
   (b) lifting said nodules by an air stream directed along an enclosed path to partially separate by gravity heavy non-fibrous particles from said nodules entrained in said air stream,
   (c) passing said air stream and entrained nodules through a cyclone to concentrate said nodules,
   (d) further partially de-shotting said concentrated nodules by subjecting said nodules to the action of a screen device to separate non-fibrous from fibrous particles of said nodules, and then passing said partially de-shotted nodules in an air stream along an enclosed path to again partially separate by gravity heavy non-fibrous particles from said nodules entrained in said air stream,
   (e) directing said air stream and entrained nodules of step (d) through a cyclone to concentrate said nodules, and
   (f) additionally nodulating said partially de-shotted nodules concentrated in said step (e) to further compact said nodules.

5. The method of claim 1 wherein said rotor comprises a cylindrical array of vertical spaced blades located centrally within said classifying chamber for rotation on a vertical axis.

6. The method of claim 1 which includes the additional steps of:
   (a) screening the by-product to separate fibrous particles from a major portion of non-fibrous particles,
   (b) passing the fibrous particles separated by the screening through the air classifying means to further de-shot said particles, and
   (c) collecting said further de-shotted particles.

7. The method of claim 1 wherein the shot-containing mineral wool fibers to be de-shotted are in the form of a felted layer.

8. The method of claim 7 wherein the rotor comprises a cylindrical array of vertical spaced blades located centrally within said classifying chamber for rotation on a vertical axis.

9. An apparatus for de-shotting shot-containing mineral wool fibers comprising a granulator for compacting said mineral wool fibers into entangled nodules comprising fibrous and non-fibrous particles, means for conveying said nodules from said granulator directly to an air classifier, said air classifier being adapted to open up said nodules and separate fibrous particles of said nodules from a by-product mainly consisting of non-fibrous particles, said air classifier including a classifying chamber having a rotor adapted both (a) to subject air-entrained fibrous nodules inside said classifying chamber to a centrifugal force, and (b) to permit opened up and de-shotted fibrous particles to pass therethrough and out of said classifying chamber, and means for collecting the opened up and de-shotted fibrous particles and by-product discharged from said air classifier.

10. The apparatus of claim 9 wherein said rotor comprises a cylindrical array of vertical spaced blades located centrally within said classifying chamber for rotation on a vertical axis.

11. The apparatus of claim 9 which includes means for converting molten mineral fiber forming material into a felted layer of the shot-containing mineral wool fibers to be de-shotted and means for delivering said felted layer for granulation.

12. An apparatus for de-shotting shot-containing mineral wool fibers comprising a first granulator for compacting said mineral wool fibers into lightly entangled nodules comprising fibrous and non-fibrous particles, means for conveying said nodules from said first granulator to separating means for partially de-shotting said nodules, means for conveying the partially de-shotted nodules to a second granulator for further compacting said nodules, means for conveying the further compacted nodules directly to an air classifier, said air classifier being adapted to open up said nodules and separate fibrous particles of said nodules from a by-product mainly consisting of non-fibrous particles, said air classifier including a classifying chamber having a rotor adapted both (a) to subject air-entrained fibrous nodules inside said classifying chamber to a centrifugal force, and (b) to permit opened up and de-shotted fibrous particles to pass therethrough and out of said classifying chamber, and means for collecting the opened up and de-shotted fibrous particles and by-product discharged from said air classifier.

13. An apparatus for de-shotting shot-containing mineral wool fibers comprising a first granulator for compacting said mineral wool fibers into lightly entangled nodules comprising fibrous and non-fibrous particles, means for conveying said nodules from said first granulator to a screen device for partial separation of non-fibrous from fibrous particles of said nodules, means for conveying the partially de-shotted nodules from said screen device to a cyclone for concentrating said nodules, means for conveying said concentrated nodules from said cyclone to a second granulator for further compacting said nodules, means for conveying the further compacted nodules from said second granulator directly to an air classifier, said air classifier being adapted to open up said nodules and separate fibrous particles of said nodules from a by-product mainly consisting of non-fibrous particles, said air classifier including a classifying chamber having a rotor adapted both (a) to subject air-entrained fibrous nodules inside siad classifying chamber to a centrifugal force, and (b) to permit opened up and de-shotted fibrous particles to pass therethrough and out of said classifying chamber, and means for collecting the opened up and de-shotted fibrous particles and by-product discharged from said air classifier.

14. The apparatus of claim 13 wherein:
(a) said means for conveying said nodules from said first granulator to said screen device comprises a conveyor for transporting said nodules to a position below an lower open receiving end of a first duct, means for inducing suction within said first duct, and a cyclone having (i) an intake which communicates with an upper discharge end of said first duct and (ii) a discharge tube which empties into a chute feeding said screen device, whereby said nodules are picked up from said conveyor by suction and carried through said first duct to said cyclone wherein said nodules are concentrated for discharge into said chute; and
(b) said means for conveying said partially de-shotted nodules from said screen device to said cyclone of claim 13 comprises a vertically extending discharge tube having its upper open end positioned below said screen device to receive said partially de-shotted nodules, the lower end of said discharge tube (i) having a perforated bottom for partial separation of non-fibrous from fibrous particles of said nodules and (ii) communicating with the lower intake end of a second duct, said second duct having an upper discharge end which communicates with the intake of said cyclone of claim 13 means defining, an outlet port being provided in the section of said second duct adjacent to said cyclone of claim 13 to permit heavy non-fibrous particles to fall from said second duct, and means for inducing suction within said discharge tube and second duct, whereby the partially de-shotted nodules fall from said screen device into said discharge tube and are picked up by suction and carried to said cyclone of claim 13, and non-fibrous particles separate from said nodules through said perforated bottom of said discharge tube and said outlet port of said second duct.

* * * * *